Dec. 8, 1953
J. A. RONNING
2,661,584
MOBILE LEAF GATHERING, COMMINUTING, AND
REDISTRIBUTING MACHINE
Filed March 15, 1948
4 Sheets-Sheet 1
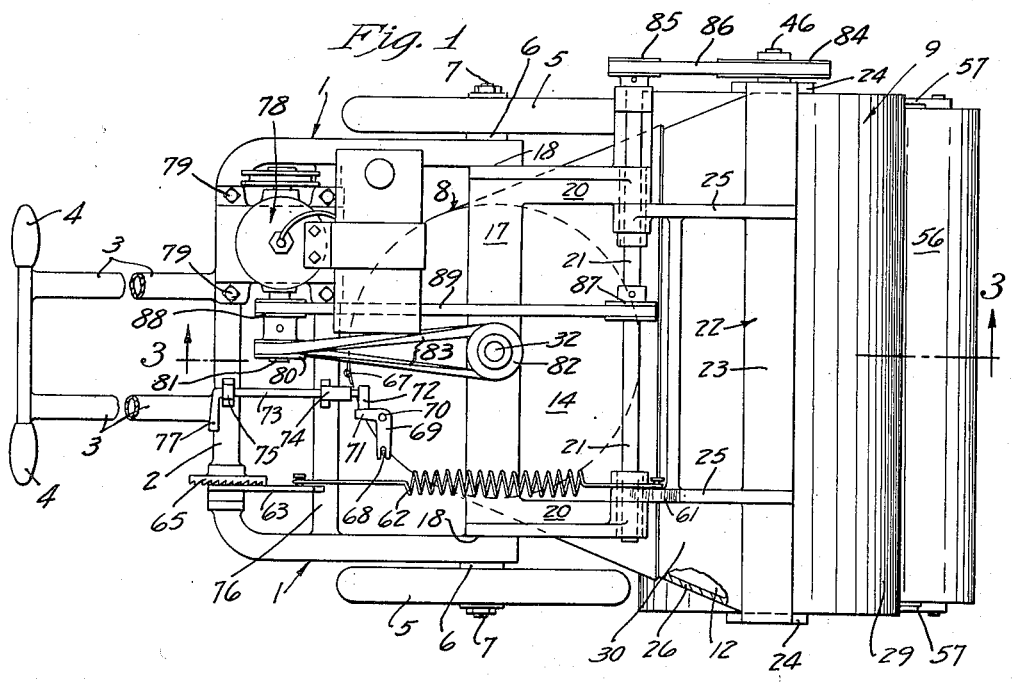
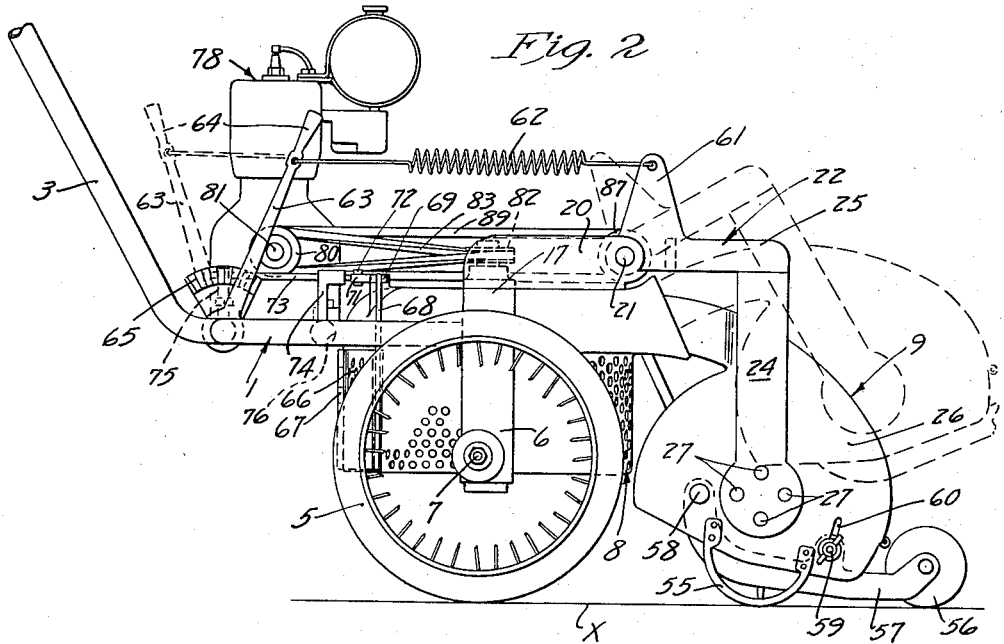
Inventor
Jacob A. Ronning
By his Attorneys
Merchant & Merchant

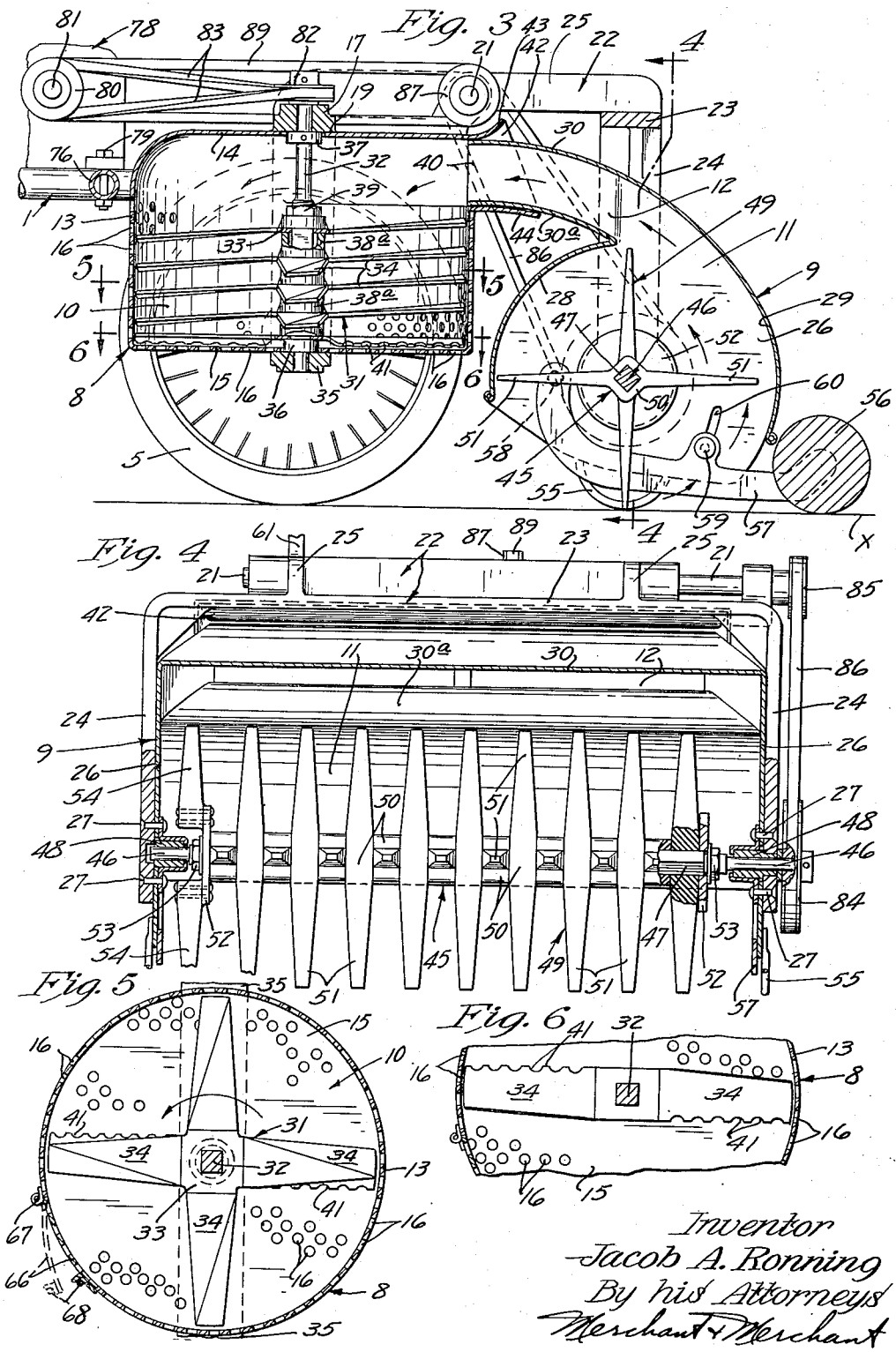

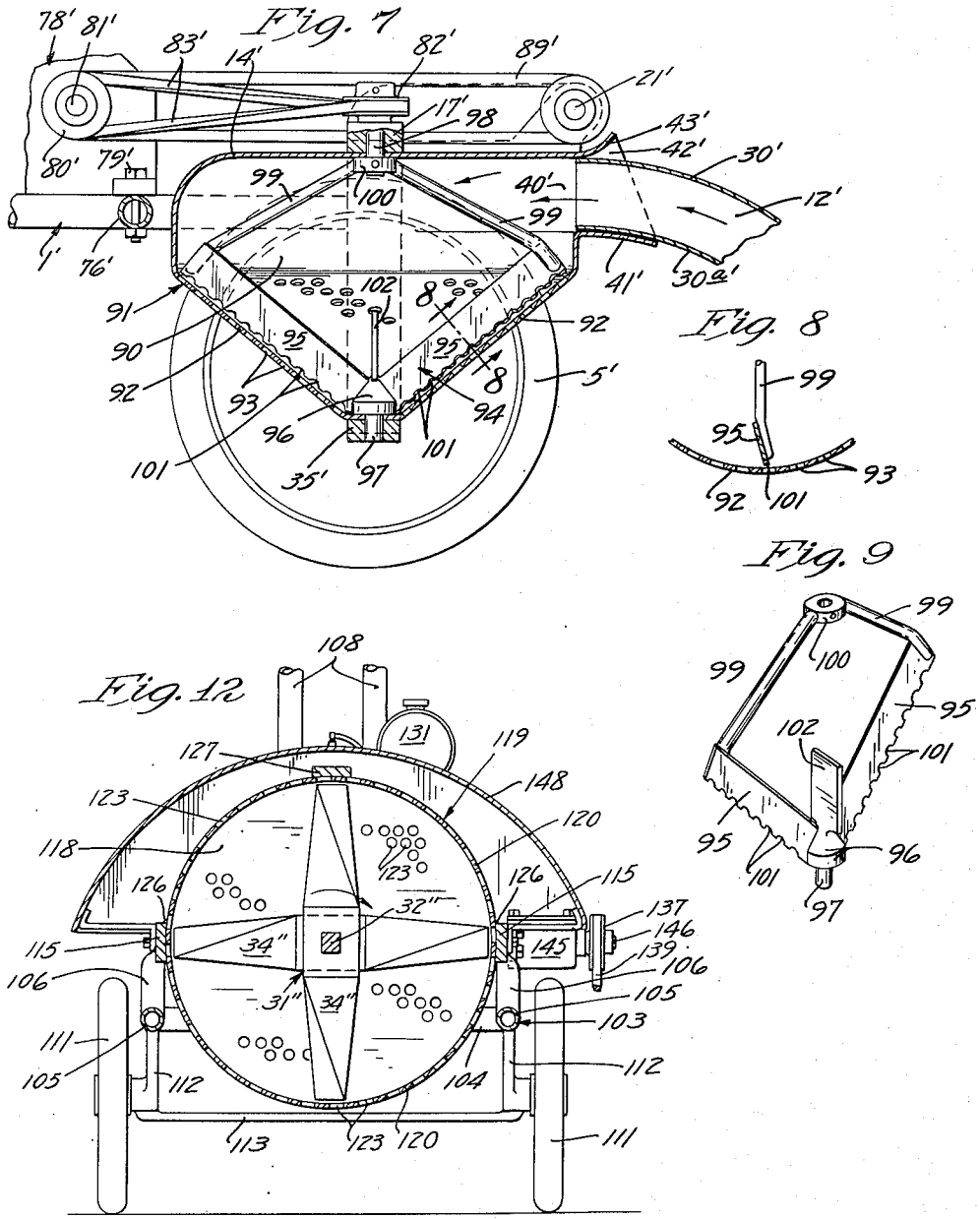

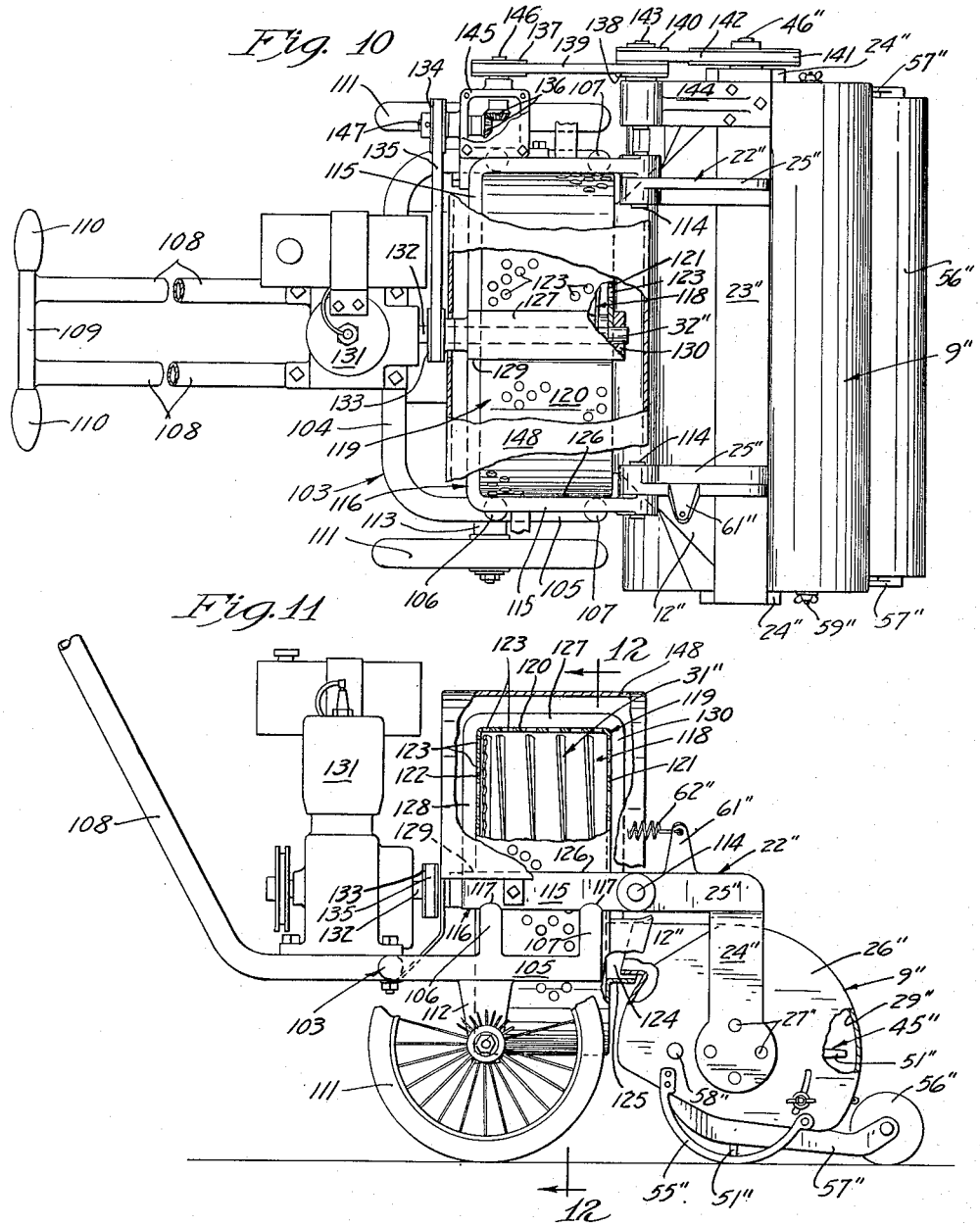

UNITED STATES PATENT OFFICE 2,661,584

MOBILE LEAF GATHERING, COMMINUTING, AND REDISTRIBUTING MACHINE

Jacob A. Ronning, Minneapolis, Minn.

Application March 15, 1948, Serial No. 14,905

11 Claims. (Cl. 55—118)

Generally stated, my present invention relates to improvements in machines for the efficient handling of leaves which have fallen to the ground from deciduous trees.

At the end of the growing season each year, lawns of closely-cut grass about houses and garden areas, and in parks, playgrounds, cemeteries and the like, become littered with leaves falling from deciduous trees. These leaves are usually removed and disposed of, by dumping or burning at some remote place, to restore the otherwise well-kept appearance of the closely-cut grass lawn, and to safeguard the roots of the grass against suffocation during the long period required to bring about disintegration of the leaves by natural processes. This practice of disposing of leaves by removal is very costly in terms of man hours, and has the further disadvantage of depriving the soil of valuable and much-needed nourishment.

Broadly stated, an important objective of the present invention is the provision of an improved mobile machine which, when moved over a surface on which leaves are deposited, will gather leaves, break the same into small particles, and distribute the leaf particles over the surface as a mulch that will be disintegrated rapidly by nature to restore valuable nourishment to the soil, but which, in the interim between distribution and disintegration, will protect the roots of grass and plants from heat, cold and drought without smothering the same.

Another broad object of the instant invention is the provision of an improved machine of the class described, whereby the operations of gathering the leaves from the ground, breaking the leaves down into fine particles and redistributing the leaves over the ground as a mulch, are carried out automatically, successively and with greater efficiency and rapidity than has hitherto been possible or practical.

A still further object of the present invention is the provision of a machine of the kind described, which is simple and durable of construction and can be produced and maintained at relatively low cost.

In accordance with the present invention, leaves are gathered from the surface being traversed by the machine and delivered to the comminutor chamber within which they are subjected to a comminuting action, and from which they are discharged back onto the surface being traversed, the comminuting action preferably being accomplished, in all instances, by a comminutor rotor.

Another particular object of the instant invention is the provision, in a machine of the class described, of a comminutor of improved construction, arrangement and efficiency.

Another important objective of the instant invention is the provision, in a machine of the class described, of an improved comminutor having a chamber wherein material is circulated and recirculated, under the influence of a comminutor rotor, without traversing the inlet passage to said chamber or contacting or otherwise interfering with the material stream entering the comminutor chamber through the inlet passage thereof.

Another important objective of the instant invention is the provision, in a machine of the class described, of an improved comminutor in combination with a sweeper involving a power-driven comminutor rotor enclosed within a comminutor chamber whereto material is introduced adjacent one end of the rotor and travels a spiral course about the interior of the comminutor chamber toward the other end of the comminutor rotor. In the preferred embodiments of the invention, illustrated, the inlet passage to the comminutor chamber is axially outwardly of one end of the comminutor rotor and the comminutor chamber is defined in part by a generally circular wall radially outwardly of the comminutor rotor and which, generally circular wall, is foraminous to provide a multiplicity of highly restricted outlet passages for fines, during the spiral travel of the material within the comminutor chamber.

A still further objective of the instant invention is the provision, in a machine of the class described, of an improved comminutor in combination with a sweeper involving a comminutor chamber and rotor, the comminutor chamber being provided with inlet and outlet passages adjacent opposite axially spaced ends of the comminutor rotor, whereby material passing from the inlet passage to the outlet passage or passages will travel a spiral course about the interior of the comminutor chamber for progressive and successive action thereto by axially spaced portions of the comminutor rotor and may travel repeatedly about the interior of the comminutor chamber without traversing the inlet passage or colliding with the stream of material entering the comminutor chamber through the inlet passage. In the preferred embodiments of the invention illustrated herein, the end wall of the comminutor chamber adjacent that end of the comminutor rotor opposite the inlet passage is foraminous to provide a multiplicity of the said outlet passages, these being sized to control the maximum particle size discharged from the comminutor chamber.

A still further objective of the instant invention is the provision, in a machine of the kind described and having a generally circular foraminous wall through which fines are discharged throughout most of the circumferences thereof, of means for confining and controlling the discharge from the comminutor.

A still further objective of the invention is the provision, in a machine of the class described, and involving a rotor-equipped sweeper and a rotor-equipped comminutor in receiving communication with the sweeper, of an improved relationship of sweeper and comminutor whereby the sweeper may be upwardly and downwardly adjusted with respect to the ground independently of the comminutor and, hence, without overcoming the inertia of the comminutor or the gyroscopic action of the comminutor rotor, even though the axis of the comminutor rotor may be angularly disposed with respect to that of the sweeper rotor and the direction of movement of the sweeper.

A still further objective of the instant invention is the provision, in a machine of the class described, of means for causing the automatic discharge of material from the comminutor chamber independently of the normal outlet passage or passages thereof. Preferably, and as herein illustrated, this is accomplished by providing in a wall of the comminutor chamber a displaceable section, together with operating means therefor extending to and including a control element within convenient reach of the operator, and whereby the operator may control movements of the displaceable section to and from its operative position without interrupting the operation or forward progress of the machine. In this way, the operator may quickly dispose of any matter incapable of comminution, or any matter whatsoever which tends to clog or otherwise interfere with the successful operation of the machine.

The above and other highly important objects and advantages of the invention will become apparent from the following specification, claims and appended drawings.

In the accompanying drawings, like characters indicate like parts throughout the several views.

Referring to the drawings:

Fig. 1 is a plan view, with some parts broken away, of a machine involving one embodiment of the invention hereof;

Fig. 2 is a view in side elevation, with some parts broken away, of the machine of Fig. 1;

Fig. 3 is an enlarged longitudinal section taken substantially on the line 3—3 of Fig. 1, with some parts broken away;

Fig. 4 is a detail sectional view taken on the line 4—4 of Fig. 3, with some parts broken away;

Fig. 5 is a horizontal sectional view taken on the line 5—5 of Fig. 3;

Fig. 6 is a fragmentary sectional view taken on the line 6—6 of Fig. 3;

Fig. 7 is a view corresponding to Fig. 3, with some parts broken away, and showing the modified form of comminutor;

Fig. 8 is a fragmentary detail in section taken on the line 8—8 of Fig. 7;

Fig. 9 is a view in perspective of the comminutor rotor of Fig. 7;

Fig. 10 is a view in plan, with some parts broken away, showing a still further embodiment of the invention;

Fig. 11 is a view in side elevation, with some parts broken away, and some parts shown in section, of the machine of Fig. 10; and Fig. 12 is a vertical sectional view taken on the line 12—12 of Fig. 11.

*Description of Figs. 1 to 6, inclusive*

In these figures, the main frame of the machine is indicated by 1 and is generally U-shaped, as will be seen best by reference to Fig. 1, the rear transverse portion 2 of the frame 1 being provided with outwardly and rearwardly extending handle bars 3 that are tied together at their outer ends and provided with operator's handles 4. The U-shaped frame 1 is mounted on laterally spaced ground wheels 5 through the medium of depending legs 6 and stub axles 7. The legs 6 are rigidly secured and depend from the forwardly projecting ends of the U-shaped frame 1, and the stub axles 7 are rigidly mounted on the lower ends of the legs 6.

Mounted on the wheel-supported frame 1 is a two-part housing structure comprising sections 8 and 9, respectively, the former defining a comminutor chamber 10, and the latter defining a sweeper chamber 11 and tangential discharge passage 12. The housing section 8, defining the comminutor chamber 10, comprises a generally vertically disposed, generally cylindrical wall 13, an upper end wall 14, and a lower end wall 15, the said walls 13 and 15 preferably being foraminous to provide therein a multiplicity of highly restricted discharge passages 16 for fines of predetermined maximum size. The said housing section 8 defining the comminutor chamber 10 is rigidly anchored to the U-shaped frame 1 through the medium of a horizontal frame cross member 17 extending between and rigidly secured to opposite ends of the U-shaped frame 1 as at 18 (see Fig. 1). The upper wall 14 of the housing section 8 is welded or otherwise rigidly secured to the underside of the cross member 17, as at 19 in Fig. 3. The housing section 9 is pivotally mounted on forwardly projecting arms 20 of the frame cross member 17 by means of a rotary power driven shaft 21 journalled in the free ends of the frame arms 20, and an auxiliary frame structure 22. The auxiliary frame structure 22 comprises a horizontally disposed member 23 overlying the housing section 9, depending laterally spaced legs 24, and rigid arms 25 projecting rearwardly from the cross member 23 and journalled at its projected ends on the shaft 21 adjacent the arms 20, the lower ends of the legs 24 being anchored fast to opposite laterally spaced end wall-forming plates 26 of the sweeper chamber defining housing section 9, as shown best at 27 in Fig. 4. The sweeper chamber is open at its bottom and is defined by the said end wall-forming plates 26 and generally arcuate wall sections 28 and 29 extending transversely between the end wall-forming plates 26. The arcuate sweeper chamber wall section 29 is contiguous and tangential with a wall section 30 forming the top of the tangential sweeper chamber outlet conduit 12, and the bottom wall 30a of the outlet conduit 12 is generally arcuate and is parallel to the wall 30 and joins the upper end of the arcuate wall section 28. Laterally spaced side walls of the outlet conduit 12 are contiguous with and in the nature of extensions of the side wall forming plates 26, and these converge rearwardly in the direction of the housing section 8, as best shown in Figs. 1 and 4.

The comminutor rotor, indicated as an entirety by 31, is concentrically disposed within the upwardly and downwardly directed generally cylindrical comminutor chamber 10, and, as shown, comprises a power-driven rotary shaft 32 having mounted thereon an axially spaced series of comminuting devices each comprising a hub portion 33 and circumferentially spaced blades 34. The upper end portion of the shaft 32 is journalled directly in the rigid frame cross member 17, and the lower end of the shaft 32 is similarly journalled in a rigid frame cross member 35 extending between the lower ends of frame legs 24. The comminutor shaft 32 is retained against axial movements in the comminutor chamber by means of spaced thrust bearings 36 and 37 fast on the shaft 32, and respectively engages cross members 35 and 17. The blade-equipped hubs 34 of the axially spaced comminuting devices are maintained in desired axially spaced relation on the shaft 32 by means of spacer sleeves 38a, and the several hub portions 33 and intervening spacing sleeves 38a are tightly clamped together on the shaft between the end thrust bearing flange 36 and a clamping nut 39 screw-threaded on the shaft 32. In order to insure common rotation of the blade-equipped hubs 33 with the shaft 32, the portion of the shaft intermediate the bearing flange 36 and the nut 39 is enlarged and made cross-sectionally angular or square, and the said hub portions 33 are provided with angular apertures matching the rectangular portion of the shaft (see particularly Figs. 3, 5 and 6).

Preferably, and as shown best in Figs. 3, 5 and 6, the free ends of the comminutor blades 34 of the several axially spaced series thereof work close to the inner surface of the cylindrical wall 13 and are shaped to substantially conform to the arcuate contour of said wall, whereby to produce a grinding action therebetween and the comminutor chamber wall 13. Also, in the preferred arrangement illustrated, the several blades 34 are all slightly pitched in the manner of propeller blades to increase the comminutor wall area covered by the tips or free ends of the several comminutor blades without increasing the frontal areas of the leading edges of said blades, which latter are preferably relatively narrow and sharp to produce a maximum cutting or breaking action on leaves and other material. However, in the form of the invention illustrated in Figs. 1 to 6, inclusive, the outlet or discharge conduit 12 from the sweeper chamber feeds into the upper portion of the comminutor chamber 10 through a comminutor chamber inlet passage 40 located above the plane of the upper end of the comminutor rotor 31 and progresses axially downwardly thereto, under the action of gravity, so that in many instances, at least, it will be desirable to neutralize the current producing effects of the pitched blades 34. One way of accomplishing this result is by reversely pitching circumferentially alternate blades 34 of each circumferentially spaced set thereof projecting from a common hub 33. In the arrangement illustrated in Figs. 1 to 6, inclusive, this procedure is followed in connection with all but the bottom circumferentially spaced set of blades 34, which are all downwardly pitched toward its trailing edges, which latter edges are, in turn, serrated as at 41 and work closely over the foraminous bottom 15 of the comminutor chamber. This tends to produce a very slight but unobjectionable downdraft through the comminutor chamber, and greatly increases the comminutor wall area, which cooperates directly with the rotor in producing grinding action on leaves and other material being operated on. Hence, in accordance with this embodiment of the invention, both the periphery and an end of the comminutor cooperate with adjacent walls of the comminutor chamber in producing a grinding action on the material, and, of course, this results in greatly increased efficiency over any machine wherein only the periphery or an end of the comminutor rotor is utilized for the purpose of grinding material in cooperation with an adjacent casing wall. Of course, this feature is of maximum importance in a machine wherein the chamber walls cooperating with the rotor in the manner specified are foraminous for the purpose of discharging fines as they are created, the foraminous wall providing a suitably irregular surface for efficient grinding action in connection with the rotor. The serrations 41 in the trailing edges of the lower set of comminutor blades 34 do, of course, add considerably to the efficiency of these blades in their cooperation with the bottom wall of the chamber, and have the further advantageous effect of reducing down-draft producing ability of these blades. Of course, if tests on certain material indicate that the rate of speed from top toward the bottom of the comminutor chamber, under the action of gravity, is too slow for maximum efficiency, the rate of speed in this direction can be increased by slightly pitching all of the upper set of blades 34 in a down-draft producing direction. On the contrary, if the rate of speed downwardly through the comminutor chamber 10 is found to be too great, this matter can be compensated for by pitching a greater number of blades 34 in a direction to produce an up-draft, than those pitched to produce a downdraft. Actual experiments have shown that efficiency can often be increased by resorting to these last mentioned expedients. Of course, the pitching of circumferentially alternate blades 34 in opposite directions tends to cause the material to travel a somewhat zig-zag, although generally spiral, course within the comminutor chamber, which in itself increases the efficiency of the machine.

By reference particularly to Fig. 3, it will be seen that the rearwardly projected end of the sweeper chamber outlet conduit 12 works telescopically in the forwardly projecting conduit section 42 of the housing section 8, and which defines the inlet passage 40 to the comminutor chamber 10. The laterally spaced sides of this coupling-acting conduit section 42 are parallel to and slidably engage the sides of the conduit section 12, and the upper wall 43 of this coupling-acting conduit section 42 is upwardly curved on an arc concentric with the axis of the shaft 21 so as to permit upward pivotal movements of the housing section 9 on the axis of the shaft 21 without appreciably varying the working clearance between wall portions 30 and 43. The bottom wall 44 of the coupling-acting conduit section 42 similarly slidably engages the bottom wall 39a of the conduit section 12 under pivotal movements of the housing section 9 on the axis of shaft 21.

Concentrically disposed within the sweeper chamber 11 and on a substantially horizontal axis extending transversely of the machine is a pick-up or gathering device in the nature of a sweeper rotor 45. The sweeper preferably comprises housing section 9 defining the sweeper chamber 11, and the said sweeper rotor. The sweeper rotor 45 comprises a power-driven shaft 46 having a cross-sectionally angular intermediate portion 47 journalled at its opposite ends in bearings 48 in opposite side wall forming plates 26, and a series of sweeping elements or devices 49 arranged in axially abutting relation on the cross-sectionally angular intermediate portion 47 of the shaft 46. The sweeping elements or devices 49 are shown as being formed of resilient material, such as rubber or synthetic rubber, and comprise hub portions 50 having rectangular apertures matching the rectangular intermediate wall portion 47 of the shaft 46 and formed with radially projecting sweeper fingers 51. The sweeper fingers 51 of each device 49 are shown as being two in number and spaced 180 degrees apart, the axially adjacent devices 49 being angularly positioned 90 degrees apart on the shaft. Flange-acting plates 52 are applied on opposite end portions of the rectangular intermediate portion 47 of the shaft 46, and the hubs 50 of the intervening sweeping devices or elements 49 are clamped between these flange-acting plates 52 by means of clamping nuts 53 screw-threaded on the shaft 46. In order to extend the sweeper rotor over the bearings 48 and as close as possible to the walls 26, the flange-acting plates 52 are preferably provided with resilient sweeper fingers 54.

The sweeper rotor 45 works through the open bottom of the sweeper chamber 11 and in closely spaced relation to the surface being traversed, and the sweeper rotor and housing section 9 are supported directly from the ground through the medium of skids or the like 55 applied to and depending from opposite side wall-forming plates 26. The arcuate wall section 9 of the sweeper chamber 11 terminates above ground level X (see particularly Fig. 3), and the space between the lower end of arcuate wall section 29 and ground level X is largely closed by a closure-acting roller 56 journalled to the free ends of arms 57 that are pivoted at 58 to opposite side walls 26 for upward and downward swinging movements of the roller 56 independently of the housing section 9. Upward and downward rocking movements of the arms 57 and roller 56 are limited by engagement of pins 59 with the ends of arcuate slots 60 in the side plates 26.

Pivotally rocking the housing section 8 and sweeper rotor 45 from its operative positions, shown by full lines in Figs. 2 and 3, to its inoperative positions, shown by dotted lines in Fig. 2, I provide mechanism comprising an arm 61 integral with and projecting upwardly from one of the arms 25, a tension spring 62 and an operating lever 63 having a handle 64 located for convenient operation by the operator. The operating lever 63 is pivoted on the cross member 2 of the frame 1 and works over a toothed segment 65 fast on the part 2. The lever 63 is laterally yieldable and engages the toothed sector 65 with yielding pressure, which can be reached by application of lateral pressure on the handle 64 in a direction away from the sector, the lever 63 being provided with teeth for engagement with the teeth of the sector. With this mechanism, the operator may momentarily raise and lower the housing section 9 and sweeper rotor to pass over obstructions or foreign objects in the path of the sweeper rotor, or may cause the sweeper rotor and housing section 9 to be maintained in elevated inoperative position for transportation purposes.

To facilitate the removal or disposal from the comminutor chamber of any material apt to damage or tending to clog, obstruct or interfere with the action of the comminutor, I provide in the generally cylindrical wall 13 of the comminutor a displaceable arcuate section 66. This displaceable section 66 is foraminous, as are the adjacent portions of the cylindrical wall 13 of the comminutor chamber, and when in operative position, shown by full lines in Fig. 5, is contiguous with and forms part of the generally cylindrical wall 13. One vertical edge of the displaceable section 66 is hinged at 67 to an adjacent vertical edge of the generally cylindrical wall 13 for outward swinging movements to the position shown by dotted lines in Fig. 5, in which position the said generally cylindrical comminutor wall 13 is open for the tangential discharge of material. Normally, this hinged displaceable wall section 66 is releasably locked in its closed position by means of the following described mechanism: A rod 68 projects upwardly from the free vertical edge of the displaceable section 66 (see particularly Fig. 2) and at its upper end works in an elongated notch in the free end of one arm of a bell crank 69 (see particularly Fig. 1) that is intermediately pivoted at 70 to the upper portion of the comminutor chamber. Reacting against the arm 71 of the bell crank 69 is an operating cam 72 mounted fast on an operating shaft 73 journalled in upstanding brackets 74 and 75 carried respectively by transverse cross members 2 and 76 of the frame 1. When the cam 72 is rotated to the position shown by full lines in Fig. 1, the displaceable wall section 66 is positively locked in closed position, but when the said cam is given approximately 90 degrees of rotation from its said full line position of Fig. 1, it releases the arm 71 of the bell crank 69 and permits the bell crank 69 and displaceable wall section 66 to move pivotally in clockwise directions, with respect to Figs. 1 and 5, to an open position of the wall section 66. This mechanism does not positively open the displaceable wall section or closure 66, but merely unlocks the same and leaves the said displaceable section free to be moved open by internal pressure, such as will be caused by centrifugal action of material whirling about the inner surface of the circular comminutor chamber wall 13. However, once opened, the displaceable section 66 may be returned to its closed position and locked in this position by rotating the cam 72 back to its position of Fig. 1. It will be noted that the operating shaft 73 of the cam 72 is provided at its rear end with an operator's handle 77, which is located within reach of the operator from his normal position behind the handles 4.

The rotors 45 and 31 are driven from a prime mover in the nature of an internal combustion engine 78 mounted on the cross members 2 and 76 of the frame 1 by bolts or the like 79 (see Fig. 1). The power transmission connections from this engine 78 to the comminutor rotor comprise a V-pulley 80 fast on one end of the crank shaft 81 of the engine 78, a V-pulley 82 fast on the upper end of the comminutor shaft 32, and a V-belt 83 running over the pulleys 80 and 82, the said comminutor rotor being driven in a counterclockwise direction with respect to Figs. 1 and 5. The sweeper rotor 49 is driven in a counterclockwise direction with respect to Figs. 2 and 3 from the said engine 78 through power transmission connections comprising a V-pulley 84 fast on one projected end of the sweeper rotor shaft 46, a V-pulley 85 fast on one projected end of the shaft 21, a V-belt 86 running over the pulleys 84 and 85, a V-pulley 87 fast on the intermediate portion of shaft 21, a V-pulley 88 fast on the engine crank shaft 81, and a V-belt 89 running over the pulleys 87 and 88.

*Summary of operation, machines of Figs. 1 to 6, inclusive*

The machine of these figures will usually be advanced over the surface of the ground X in a direction from left to right with respect to Figs. 1 to 3, inclusive, and in which direction of advancement the comminutor chamber defining housing section 8 follows behind the sweeper chamber defining housing section 9, the machine being guided and propelled by an operator walking behind and grasping the handles 4. However, if desired, the machine of these figures may be advanced over the ground surface in a direction from right to left with respect to Figs. 1 to 3, and in which case the comminutor will discharge in advance of and in the path of the sweeper rotor 45. When the machine is advanced over a leaf-littered ground surface in a direction from left to right with respect to Figs. 1 to 3, leaves encountered by the sweeper rotor 45 will be raised off the surface of the ground and rotated in a clockwise direction with respect to Fig. 3 through the sweeper chamber, and tangentially discharged therefrom through the discharge conduit section 12 of the sweeper chamber 11 into the upper portion of the comminutor chamber 10 through the inlet opening 40 thereto. The incoming stream of leaves entering the comminutor chamber above the plane of the top end of the comminutor rotor will gravitate toward the bottom of the comminutor chamber, but in so doing will be encountered by the comminutor blades 34 and caused to whirl about the interior of the comminutor chamber in a generally spiral course downwardly therethrough. Of course, the whirling material will tend to follow the interior of the circular comminutor chamber wall 13 during the course of its downward spiral travel, and will be discharged through the numerous discharge openings 16 in the foraminous circular wall 13 as fast as it is broken down into fines capable of free discharge through the said restricted openings 16, thereby progressively disposing of the material during its downward spiral travel. During the downward spiral travel of the material within the comminutor chamber, it will, of course, be successively engaged by the blades 34 of successively lower comminuting devices 31. During its downward travel through the comminutor chamber, the leaves will be broken by direct contact with the leading edges of the blades 34 and as a result of a grinding action thereon between the tips of the blades 34 and the interior of the circular wall 13. Here it may be stated that one of the advantages of this type of comminutor is the fact that the capacity and efficiency of the comminutor can be increased to a great extent without increasing the overall diameter of the comminutor by merely increasing the length of the comminutor chamber and rotor. However, when operating on reasonably dry leaves, a large proportion of the leaves will be disposed of as fines through the restricted outlet passages 16 of the foraminous circular wall 13 before reaching the bottom wall 15 of the comminutor chamber 10. Much of the material reaching the bottom wall 15 will be damp leaves, fibrous leaf stems, grass, and the like, all of which is difficult to break down, and this material will be subject to a severe grinding action between the lowermost blades 34 and the foraminous bottom wall 15 of the comminutor chamber, in addition to the impact of the leading edges of the blades 34 adjacent or near the bottom of the comminutor chamber, and in addition to the continual grinding of such material between the tips of the blades and the circular wall 13, all of which will combine to rapidly break down such tough material. Obviously, material will be discharged from the comminutor chamber both radially of the comminutor chamber and axially downwardly from the comminutor chamber, and will be redeposited as fines over the surface being traversed as a mulch. When the surface being traversed is a grass lawn, for example, the fine leaf particles will rapidly gravitate to the ground adjacent the roots of the grass where it will form a temporary protection for the grass roots, and will rapidly disintegrate to restore to the soil vital nutrition.

In passing over irregularities of surface contour, the housing section 9 and sweeper rotor 45 will be free to move upwardly and downwardly on the axes of shaft 21 independently of the housing section 8 defining the comminutor chamber. Also, since these pivotal movements of the sweeper rotor are on the axis 21, which is parallel to the axis of the sweeper rotor 45, the gyroscopic action of the rapidly rotating sweeper rotor 45 will not interfere with such pivotal movements; and also since the above noted pivotal swinging movements of the sweeper chamber and sweeper rotor 45 are independent of the comminutor rotor 31, the gyroscopic action of the comminutor rotor is of no consequence, even though the axis of the comminutor rotor 31 is angularly disposed with respect to the axis of the sweeper rotor 45. This mounting of the sweeper rotor and chamber for independent up and down movements with respect to the comminutor rotor and chamber is, of course, equally important in facilitating manual raising and lowering of the sweeper chamber 11 and rotor 45 through manipulation of a lever 63.

*Description of Figs. 7 to 9, inclusive*

The machine of these figures may be considered as being identical to the machine of Figs. 1 to 6, inclusive, except for the modified form of comminutor illustrated in Figs. 7 to 9, inclusive. Hence, all parts in Fig. 7 which are identical to parts in Figs. 1 to 6, inclusive, will be indicated by like characters plus the prime mark, and parts broken away or omitted in Fig. 7 may be considered as being identical to parts of Figs. 1 to 6, inclusive. In Fig. 7, the comminutor chamber is indicated by 90 and is defined by a housing section 91 replacing the housing section 8 of Figs. 1 to 6, inclusive. The upper portion of this housing section 91 is identical to the upper portion of the housing section 8 of Figs. 1 to 6, inclusive, and the parts thereof are therefore indicated by like characters assigned to like parts in Figs. 1 to 6, inclusive, plus the prime mark. In this case, as in Figs. 1 to 6, inclusive, the comminutor chamber is cross-sectionally circular in horizontal section, but in Fig. 7, the depending cross-sectionally circular wall of the comminutor chamber is generally conical, this conical wall section being indicated by 92, and being foraminous to provide a multiplicity of highly restricted outlet passages 93 for fines. The comminutor rotor of Figs. 7 to 9, inclusive, is indicated as an entirety by 94 and comprises a diametrically opposite pair of comminutor blades 95 mounted on a common hub 96 that is journalled by means of an integrally-formed stub shaft 97 in the frame cross member 35'. The upper ends of the blades 95 are rigidly connected to the power driven stub shaft 98 journalled in the frame cross member 17 through the medium of arms 99, and an end thrust bearing collar 100 fast on the stub shaft 98. By thus making the comminutor shaft in two sections 97 and 98, respectively, the intermediate portion of the comminutor chamber is open and unobstructed. The pulley 82 is fast on the upper end of the shaft section 98, and the rotor 94 is therefore driven in the same direction and at the same rate of speed as is the comminutor rotor 31 of Figs. 1 to 6, inclusive. The comminutor blades 95 are pitched in the manner of propeller blades to produce a down-draft through the comminutor chamber, and the trailing or rear edges of the comminutor blades 95 work in very close parallel relation to the conical wall 92 and pitch upwardly therefrom toward its leading edges. The said trailing edges of the comminutor blades 95 are serrated as at at 101 to increase the efficiency of the grinding action produced therebetween and the foraminous conical wall 92. The comminutor hub 96 is preferably provided with an upstanding vane or blade 102 which tends to keep the air and material adjacent the axis of the comminutor chamber in motion. In this form of the invention, as in the form of the invention illustrated in Figs. 1 to 6, inclusive, material enters the comminutor chamber through the inlet passage 40' above the upper end of the comminutor rotor 94, and travels repeatedly about the interior of the comminutor chamber in a generally downwardly directed spiral course. In this case, the comminutor blades 95, due to their pitch, tend to force the leaves between the serrated trailing edges thereof and the foraminous conical wall 92 during the downward spiral travel of the leaves and other material about the inner surface of the conical 92, and the resultant severe grinding action, in addition to the breaking and cutting action on the leaves resulting from impact with the blades and the general cyclonic effect within the comminutor chamber, results in a remarkably thorough and rapid breaking down of the leaves into fines capable of being discharged through the restricted passages 93. Otherwise, as stated, the machine of Figs. 7 to 9, inclusive, will function substantially as well as will the machine of Figs. 1 to 6, inclusive.

*Description of Figs. 10 to 12, inclusive*

The main frame of these Figures 10 to 12, inclusive, is indicated as an entirety by 103, is generally U-shaped comprising a transverse rear portion 104, and forwardly extending side portion 105, each carrying short upright members 106 and 107. Handle bars 108 are rigidly secured to the portion 104 of the frame 103 and extend upwardly and rearwardly therefrom, being provided at their outer ends with a cross bar 109 equipped at its outer ends with handles 110. The frame 103 is supported from ground wheels 111 through the medium of rigid legs 112. Legs 112 are rigidly secured to the side portions 105 of the frame 103, and are connected at their bottoms by an axle-acting cross member 113, the wheels 111 being journalled directly to the lower ends of the frame legs 112.

In the form of the invention illustrated in these Figs. 10 to 12, inclusive, the entire sweeping mechanism is substantially identical to the sweeping mechanism of Figs. 1 to 6, inclusive, and, therefore, the several parts of the sweeper mechanism will be indicated by characters assigned to like parts in Figs. 1 to 6, inclusive, plus the double prime marks, and, incidentally, this also applies to part of the structure for pivotally mounting the sweeper on the frame of the machine. In this form of the invention, the arms 25" of the auxiliary frame structure 22" extending from the sweeper chamber defining housing section 9 are pivoted by means of stub shafts or pins 114 to the forwardly projected ends of the laterally spaced arms 115 of an U-shaped supplementary frame 116, the supplementary frame 116 being spaced above the frame 103 and being anchored fast to the post-like upright members 106 of the frame 103 as at 117 (see Figs. 11 and 12).

In the form of the invention illustrated in these Figs. 10 to 12, inclusive, the comminutor chamber and rotor are disposed on a generally horizontal axis extending generally forwardly and rearwardly of the machine, the comminutor chamber of these figures being generally cylindrical, as in Figs. 1 to 6, inclusive, being indicated by 118, and being defined by a housing or casing section 119. The said housing section 119 comprises a generally cylindrical wall 120, a front wall 121, and a rear wall 122, the said walls 119 to 122, inclusive, being preferably foraminous to provide therein highly restricted outlet passages 123 for fines. The front wall 121 of the housing section 119 is provided adjacent its bottom with an inlet opening 124 defined by a forwardly projecting coupling-acting conduit section 125 that works telescopically over the outlet conduit section 12", the latter being movable in the former under pivotal movements of the housing section 9", substantially as in Figs. 1 to 6. The maximum diameter portion of the cylindrical wall 120 of the housing section 119 is snugly embraced by and is rigidly secured to the arms 115 of the supplementary frame 116 by welding or the like, as at 126. As a further means of anchoring the housing section 119 to the frame structure of the machine, I provide an inverted U-shaped reinforcing member 127 embracing the walls 120, 121, and 122 of the housing section 119, and rigidly secured thereto by welding or the like. The depending rear leg 128 of the U-shaped member 127 is made fast to the transverse rear portion of the supplementary frame 116 by welding or the like, as at 129.

The comminutor rotor in Figs. 10 to 12, inclusive, is like the comminutor rotor 31 of Figs. 1 to 6, inclusive, and, therefore, the rotor of Figs. 10 to 12, inclusive, and the various component parts thereof are indicated by characters assigned thereto in Figs. 1 to 6, inclusive, plus double prime marks. As previously indicated, however, the comminutor rotor 31" of Figs. 10 to 12, inclusive, is disposed on a substantially horizontal axis extending generally forwardly and rearwardly of the machine, rather than on a vertical axis as in Figs. 1 to 6, inclusive. The comminutor rotor shaft 32" of Figs. 10 to 12, inclusive, is journalled at its rear end in the depending rear leg 128 of the inverted U-shaped brace member 127 and is journalled at its front end in the depending leg 130 of said inverted U-shaped brace member 127. The comminutor rotor 31" and the sweeper rotor 45" are driven from a suitable source of power, such as a frame mounted internal combustion engine 131, the former in a clockwise direction with respect to Fig. 12, and the latter in a counterclockwise direction with respect to Fig. 11, through power transmission connections as follows: The projected rear end portion of the comminutor rotor shaft 32″ is coaxial with, is suitably coupled to, and forms an extension of, the engine shaft 132, and is, therefore, driven at engine speed. The sweeper rotor 45″ is driven from the engine 131 by means of a V-pulley 133 fast on the engine shaft 132, a V-pulley 134, a V-belt 135 running over the pulleys 133 and 134, a pair of bevel gears 136, V-pulleys 137 and 138, a V-belt 139 running over pulleys 137 and 138, V-pulleys 140 and 141, and a V-belt 142 running over pulleys 140 and 141. The V-pulley 141 is fast on the projected end of the sweeper rotor shaft 46″. The V-pulleys 138 and 140 are journalled on a stub shaft 143 carried by the auxiliary frame 22″ through the medium of a bracket 144. The bevel gears 136 are enclosed and mounted in a gear box 145 carried by the supplementary frame 116. The pulley 137 and one of the bevel gears 136 are mounted on a common gear box journalled shaft 146, and the pulley 134 and the other of the bevel gears 136 are mounted fast on a common gear box journalled shaft 147.

In Figs. 10 to 12, inclusive, I have not shown the complete mechanism for raising the sweeper pivotally off the ground to its inoperative position, but this may be assumed to be identical to the mechanism shown for this purpose in Figs. 1 to 6, inclusive, and does include a tension spring 62″, which corresponds to the spring 62 of Figs. 1 to 6, inclusive.

Because the axes of the comminutor chamber 118″ and the comminutor rotor 31″ are horizontally disposed in Figs. 10 to 12, inclusive, gravity cannot be relied upon to feed material axially of the comminutor chamber and rotor. Hence, in this arrangement, I preferably pitch all of the comminutor blades 34″ slightly in a direction to produce a feeding action of the material in a direction from front to rear of the machine or from right to left with respect to Figs. 1 and 2, whereby to cause material to travel spirally about the interior of the circular comminutor chamber wall 120 under the influence of the rapidly rotating comminutor rotor 31″, the action in this case being much as in the form of the invention shown in Figs. 1 to 6, inclusive. Of course, if this pitching of all of the comminutor blades 34″ in a common direction is found, in some instances, to produce an unduly rapid rate of feed axially of the comminutor chamber, the said rate of feed may be retarded and controlled by eliminating the pitch on some of the blades, or reversely pitching some of the blades 34″.

The machine described in connection with Figs. 10 to 12, inclusive, will function very much as does the machine of Figs. 1 to 6, inclusive, and will serve substantially the same purpose. However, one important advantage of the form of the invention of Figs. 10 to 12, inclusive over that of Figs. 1 to 6, inclusive, is the fact that the comminutor rotor 31″ and comminutor chamber 118 can be increased greatly in length, when desired, for the purpose of increasing the efficiency of the comminutor, without elevating the inlet passage 124, with respect to the sweeper, which, of course, cannot be accomplished in the arrangement of Figs. 1 to 6, inclusive. The importance of this feature resides in the fact that sweeper mechanisms of the kind illustrated cannot be relied upon to elevate material to any great extent. In the structure of Figs. 10 to 12, inclusive, the discharge from the comminutor chamber will be largely through the restricted outlet passages 123 in the foraminous circular wall 120, and the rear end wall 122 of the comminutor chamber 118. In this form of the invention, it is particularly desirable to control the discharge from the upper half of the generally cylindrical foraminous wall 120, and for this purpose I provide a shield-like arcuate baffle 148 of somewhat greater radius than the circular wall 120 and overlying and spaced from the latter. This baffle-acting shield 148 prevents fines discharged from the cylindrical wall 120 from flying high into the air and directs the discharge from the upper half of the wall 120 toward the ground. With this arrangement, the fines are deposited on the surface being traversed in a path approximately the width of the sweeper.

While I have herein described several embodiments which my invention may assume in practice, it will, of course, be understood that the same is capable of further modification without departing from the spirit and scope of the invention as expressed in the following claims.

I claim:

1. In a leaf gathering, comminuting and redistributing machine, a frame member, a pair of axially aligned ground wheels rotatably supported on the frame member, a comminutor housing rigidly supported by the frame member and having an inlet opening in a wall thereof, a sweeper housing pivotally connected to said frame member on an axis parallel to the common axis of said ground wheels and disposed intermediate said housings, said sweeper housing having a discharge opening in a wall thereof in communication with said inlet opening in said comminutor housing, a sweeper rotor rotatably supported in said sweeper housing, and common drive means for the comminutor rotor and sweeper rotor, said drive means comprising a driven shaft disposed in said axis.

2. The structure defined in claim 1, wherein said sweeper housing is provided with an outlet conduit, and wherein said comminutor housing is provided with an inlet conduit in which an end portion of said first conduit is movably disposed.

3. The structure defined in claim 2, wherein said inlet conduit is provided with an upwardly curved upper wall concentric with said axis to permit the pivotal movement of said sweeper housing about the said axis.

4. The structure defined in claim 1, wherein said frame member and said sweeper housing are provided with cooperating arms having axially aligned apertures in adjacent ends thereof, and said driven shaft being journalled in said apertures and providing with said arms the said pivotal connection between said sweeper housing and said frame member.

5. The structure defined in claim 1, wherein said comminutor housing and rotor are substantially vertically disposed.

6. The structure defined in claim 1, wherein said comminutor housing and rotor are substantially horizontally disposed.

7. The structure defined in claim 1, wherein said comminutor housing is cylindrical and said rotor and housing have coincident axes extending generally forwardly and rearwardly of the machine.

8. The structure defined in claim 1, wherein said comminutor housing is cylindrical and said rotor and housing have coincident axes disposed substantially vertically, and wherein said inlet opening is disposed above the upper end of the comminutor rotor.

9. The structure defined in claim 1, together with manually operable means supported on the frame member and operatively engaged with the sweeper housing for swinging same about its pivotal connection with the frame for controlling the position of the sweeper relative to the comminutor housing.

10. The structure defined in claim 1 wherein said sweeper housing comprises opposite end walls, and a front wall having a lower edge vertically spaced above the ground, and means supported by the sweeper housing and disposed adjacent said front wall and intermediate the said lower edge thereof and the ground for substantially closing the space therebetween.

11. The structure defined in claim 1, wherein said comminutor housing is disposed substantially vertically above the axis of said ground wheels, said sweeper housing being disposed forwardly of said comminutor housing, and said drive means including a motor supported by said frame member rearwardly of said comminutor housing.

JACOB A. RONNING.

References Cited in the file of this patent

UNITED STATES PATENTS

| Number | Name | Date |
| --- | --- | --- |
| 1,753,693 | Carpenter | Apr. 8, 1930 |
| 1,987,371 | Rudd | Jan. 8, 1935 |
| 2,082,419 | Rietz | June 1, 1937 |
| 2,105,803 | Barnes | Jan. 18, 1938 |
| 2,242,922 | Poynter | May 20, 1941 |
| 2,436,011 | Lucas | Feb. 17, 1948 |